United States Patent
Meyers et al.

(10) Patent No.: US 8,477,063 B2
(45) Date of Patent: Jul. 2, 2013

(54) SYSTEM AND METHOD FOR OBSTACLE DETECTION AND WARNING

(75) Inventors: David W. Meyers, Brooklyn Park, MN (US); Long Bui, Palos Verde Estates, CA (US); Yi-Chi Shih, Palos Verde Estates, CA (US); Alan G. Cornett, Andover, MN (US)

(73) Assignee: Honeywell International Inc., Morristown, NJ (US)

( * ) Notice: Subject to any disclaimer, the term of this patent is extended or adjusted under 35 U.S.C. 154(b) by 482 days.

(21) Appl. No.: 12/245,583

(22) Filed: Oct. 3, 2008

(65) Prior Publication Data

US 2010/0085241 A1    Apr. 8, 2010

(51) Int. Cl.
*G01S 13/04*    (2006.01)
*G01S 13/93*    (2006.01)
*G01S 13/00*    (2006.01)

(52) U.S. Cl.
USPC ............... 342/90; 342/27; 342/29; 342/70; 342/89; 342/118; 342/123; 342/128; 342/129; 342/146; 342/147; 342/156; 342/158; 342/175; 342/195

(58) Field of Classification Search
USPC ......... 342/22, 27–29, 61–65, 70–72, 82–103, 342/118, 128–133, 175, 192–197, 147–158, 342/188, 123, 146; 701/1, 3, 14, 300, 301
See application file for complete search history.

(56) References Cited

U.S. PATENT DOCUMENTS

| | | | |
|---|---|---|---|
| 3,114,147 A | | 12/1963 | Kuecken |
| 3,728,727 A | | 4/1973 | Botwin et al. |
| 3,961,321 A | | 6/1976 | Moss |
| 3,986,182 A | | 10/1976 | Hackett |
| 4,027,307 A | | 5/1977 | Litchford |
| 4,193,074 A | * | 3/1980 | Schwartz et al. ............ 342/149 |
| 4,319,242 A | | 3/1982 | Lewis |
| 4,339,755 A | | 7/1982 | Wright |
| 4,403,220 A | | 9/1983 | Donovan |
| 4,442,431 A | | 4/1984 | Bleakney |
| 4,737,788 A | * | 4/1988 | Kennedy ...................... 342/29 |
| 4,755,818 A | | 7/1988 | Conrad |
| 4,855,748 A | | 8/1989 | Brandao et al. |

(Continued)

FOREIGN PATENT DOCUMENTS

DE    3740142    6/1989
EP    1391748    2/2004

OTHER PUBLICATIONS

Sarabandi, Kamal, "Millimeter-Wave Radar Phenomenology of Power Lines and a Polarimetric Detection Algorithm", "IEEE Transactions on Antennas and Propagation", Dec. 1999, p. 1807-, vol. 47, No. 12, Publisher: IEEE, Published in: US.

(Continued)

*Primary Examiner* — Bernarr Gregory
(74) *Attorney, Agent, or Firm* — Fogg & Powers LLC

(57) ABSTRACT

A obstacle detection system comprises a transmission antenna operable to radiate a radio frequency (RF) signal and a transmitter operable to control transmission of the RF signal from the antenna. The obstacle detection system also comprises a receiver antenna operable to receive a reflection of the RF signal; and processing circuitry operable to analyze a plurality of characteristics of a radar cross section (RCS) of the received reflection to identify an obstacle and one or more physical attributes of the obstacle.

16 Claims, 6 Drawing Sheets

U.S. PATENT DOCUMENTS

| | | | |
|---|---|---|---|
| 5,057,833 A | 10/1991 | Carlson | |
| 5,097,267 A | 3/1992 | Raviv | |
| 5,111,210 A | 5/1992 | Morse | |
| 5,134,410 A * | 7/1992 | Shrader | 342/90 |
| 5,296,909 A | 3/1994 | Fazi et al. | |
| 5,321,489 A | 6/1994 | Defour et al. | |
| 5,351,032 A | 9/1994 | Latorre et al. | |
| 5,392,050 A * | 2/1995 | Guerci et al. | 342/90 |
| 5,451,957 A | 9/1995 | Klausing | |
| 5,529,138 A | 6/1996 | Shaw et al. | |
| 5,712,640 A | 1/1998 | Andou et al. | |
| 5,717,399 A | 2/1998 | Urabe et al. | |
| 5,940,011 A | 8/1999 | Agravante et al. | |
| 6,014,099 A * | 1/2000 | Bennett et al. | 342/197 |
| 6,054,947 A | 4/2000 | Kosowsky | |
| 6,211,808 B1 | 4/2001 | Rees | |
| 6,246,355 B1 * | 6/2001 | Miceli et al. | 342/22 |
| 6,400,308 B1 | 6/2002 | Bell et al. | |
| 6,522,284 B2 * | 2/2003 | Miceli et al. | 342/22 |
| 6,529,157 B1 * | 3/2003 | Mensa et al. | 342/195 |
| 6,580,388 B1 * | 6/2003 | Stoyanov et al. | 342/192 |
| 6,603,423 B2 * | 8/2003 | Klausing et al. | 342/29 |
| 6,636,177 B1 | 10/2003 | Scholz | |
| 6,727,841 B1 | 4/2004 | Mitra | |
| 6,738,009 B1 | 5/2004 | Tsunoda | |
| 6,822,612 B2 | 11/2004 | Takimoto et al. | |
| 6,853,327 B2 * | 2/2005 | Miceli et al. | 342/22 |
| 6,856,279 B2 | 2/2005 | Hager et al. | |
| 6,933,900 B2 | 8/2005 | Kitamori et al. | |
| 6,987,492 B1 | 1/2006 | Buchanan et al. | |
| 7,119,734 B2 * | 10/2006 | Nakano et al. | 342/70 |
| 7,167,126 B2 * | 1/2007 | Wittenberg et al. | 342/123 |
| 7,295,149 B1 * | 11/2007 | Wolf | 342/90 |
| 7,307,579 B2 | 12/2007 | Rees et al. | |
| 7,379,017 B2 | 5/2008 | Dwelly et al. | |
| 7,443,334 B2 | 10/2008 | Rees et al. | |
| 7,598,646 B2 | 10/2009 | Cleveland | |
| 7,692,575 B2 | 4/2010 | Nishimura | |
| 2006/0044177 A1 | 3/2006 | Wittenberg et al. | |
| 2007/0018882 A1 | 1/2007 | Manoogian et al. | |
| 2007/0152814 A1 | 7/2007 | Stefani | |
| 2007/0252748 A1 | 11/2007 | Rees et al. | |
| 2008/0055149 A1 | 3/2008 | Rees et al. | |
| 2008/0169962 A1 | 7/2008 | Rees et al. | |

OTHER PUBLICATIONS

European Patent Office, "European Search Report", Sep. 5, 2011, Published in: EP.

* cited by examiner

SYSTEM AND METHOD FOR OBSTACLE DETECTION AND WARNING

CROSS-REFERENCE TO RELATED APPLICATIONS

This application is related to the following co-pending United States patent applications filed on even date herewith, all of which are hereby incorporated herein by reference:

U.S. patent application Ser. No. 12/245,334 entitled "RADAR SYSTEM FOR OBSTACLE AVOIDANCE") filed on Oct. 3, 2008 and which is referred to here as the '377 Application;

U.S. patent application Ser. No. 12/245,593 entitled "MULTI-SECTOR RADAR SYSTEM") filed on Oct. 3, 2008 and which is referred to here as the '378 Application.

BACKGROUND

Moving vehicles, such as automobiles or aircraft, typically use systems to aid in avoiding obstacles. For example, aircraft typically use radar to detect obstacles which pose a threat to the aircraft. However, conventional radar systems do not adequately detect all potential hazardous obstacles. For example, conventional radar systems do not adequately detect cables which pose a serious threat to helicopters. In addition, weather conditions, such as dust clouds, prevent increased difficulty for conventional radar systems to detect obstacles such as cables.

For the reasons stated above and for other reasons which shall become apparent to one of ordinary skill in the art upon reading and studying the present application, there is a need in the art for an improved obstacle detection system.

SUMMARY

In one embodiment an obstacle detection system is provided. The obstacle detection system a transmission antenna operable to radiate a radio frequency (RF) signal and a transmitter operable to control transmission of the RF signal from the antenna. The obstacle detection system also comprises a receiver antenna operable to receive a reflection of the RF signal; and processing circuitry operable to analyze a plurality of characteristics of a radar cross section (RCS) of the received reflection to identify an obstacle and one or more physical attributes of the obstacle.

DRAWINGS

Understanding that the drawings depict only exemplary embodiments of the present invention and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the present invention. Like reference numbers and designations in the various drawings indicate like elements.

DETAILED DESCRIPTION

Figure 1:
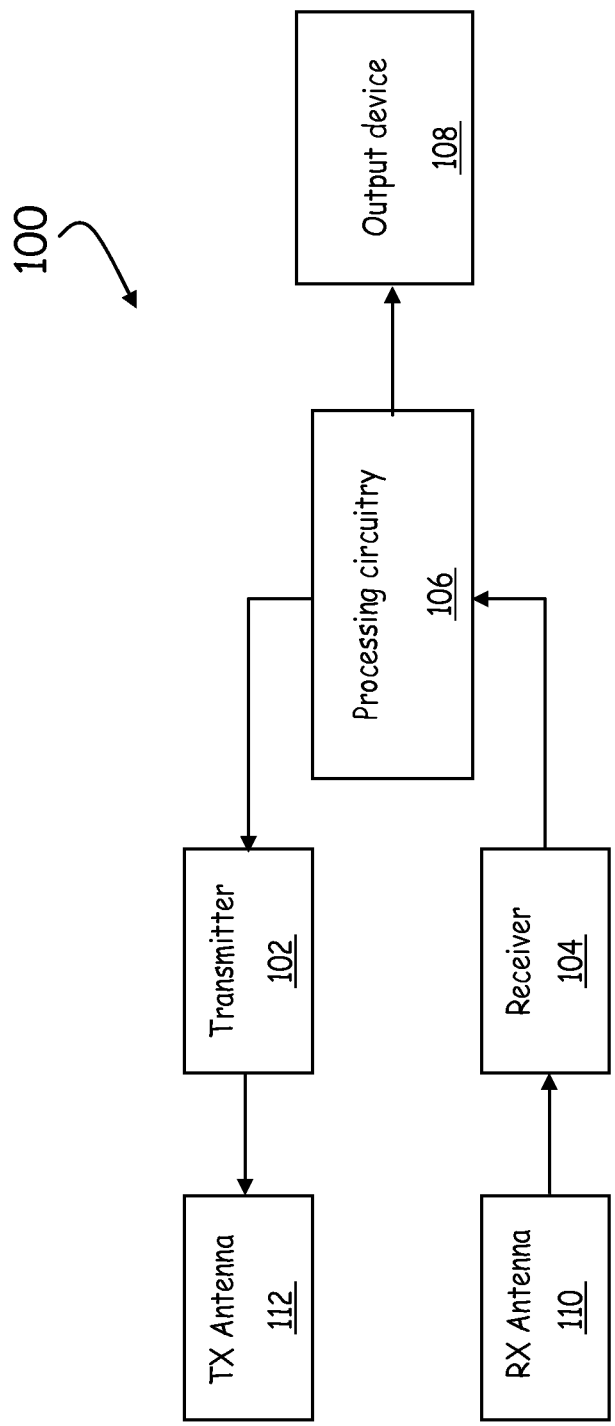
FIG. 1 is a block diagram depicting one embodiment of an obstacle detection system.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. Furthermore, the method presented in the drawing figures or the specification is not to be construed as limiting the order in which the individual steps may be performed. The following detailed description is, therefore, not to be taken in a limiting sense.

FIG. 1 is a block diagram of one embodiment of an obstacle detection system 100. System 100 includes a transmitter 102, a transmission antenna 112, a receiver 104, a receiver antenna 110, and processing circuitry 106. The transmission antenna 112 and receiver antenna 110 can be implemented in a rotatable configuration in system 100. Transmission antenna 112 transmits a radio frequency (RF) signal as directed by processing circuitry 106 and transmitter 102. In this embodiment, transmission antenna 112, transmitter 102, receiver 104, and receiver antenna 110 comprise a non-polarimetric radar. That is, RF signals transmitted from transmitter 102 and received at receiver antenna 110 have a single polarization. However, it is to be understood, that in other embodiments, a polarimetric radar system can be used.

In one exemplary embodiment, transmission antenna 112 transmits a frequency modulated continuous wave (FMCW) RF signal. The FMCW RF signal enables processing circuitry 106 to calculate a range to a detected obstacle. In some such embodiments, the RF signal has a frequency band, and transmitter 102 and receiver 104 linearly sweep through the frequencies in the RF frequency band. The linear sweep of the transmitted RF signals is synchronous with the processing of the received reflection signals.

System 100 detects obstacles near the path of a moving vehicle in which system 100 is located. For example, in one embodiment, system 100 can detect cables near an aerial vehicle, such as a helicopter. However, it is to be understood that other types of vehicles can be used in other embodiments, such as an automobile or surface ship on water. Furthermore, as used herein, the term "obstacle" refers to stationary objects which pose a potential danger to the vehicle, such as light posts, cables, docks, etc.

Figure 2:
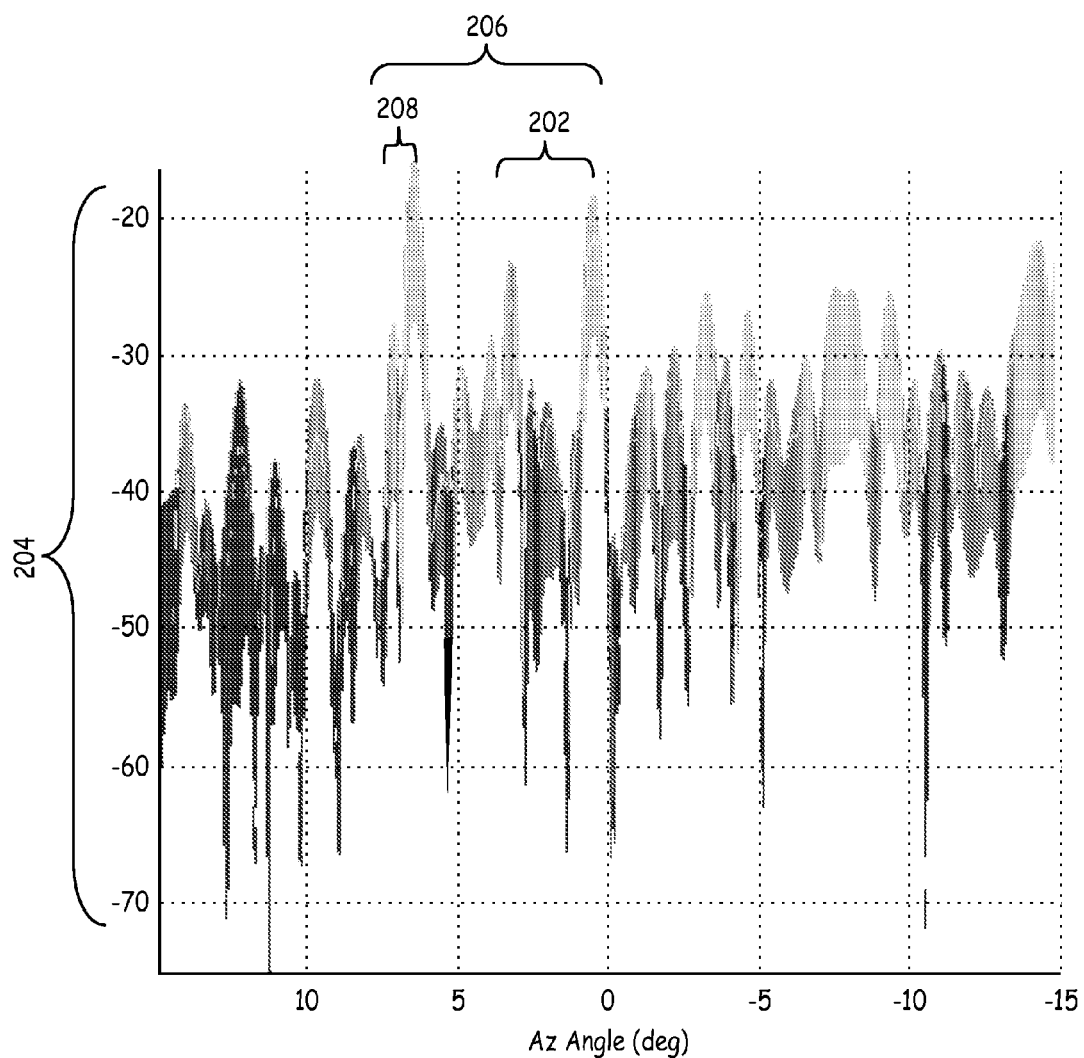
FIG. 2 is a graph depicting an exemplary return signal.

An obstacle, such as a cable, will reflect the transmitted RF signal. Receiver antenna 110 receives the reflection of the RF signal and provides the reflected signal via receiver 104 to processing circuitry 106 for analysis. Processing circuitry 106 analyzes characteristics of the Radar Cross Section (RCS) of the received reflection signal to detect an obstacle, such as a cable. The RCS changes as transmission antenna 112 and receiver antenna 110 rotate. An exemplary graph of the RCS of reflection signals vs. incident angle is shown in FIG. 2. In particular, FIG. 2 is zoomed in on a particular period of time and shows a subset of all data that is returned. Additionally, the graph in FIG. 2 shows exemplary data from a reflection of an FMCW RF signal. It is to be understood that FIG. 2 is provided by way of example and not by way of limitation, and that other cables or obstacles may reflect the RF signal differently and, thus, produce different graphs of RCS vs. incident angle.

As used herein, the term "characteristic" of an RCS of the reflection signal refers to an electrical property or quality of the reflection signal (also referred to herein as a return signal). Hence, analysis of one or more characteristics of the RCS includes more than a simple detection of the reflection signal. Exemplary characteristics analyzed by processing circuitry 106 include, but are not limited to, peak amplitude 204, peak separation distance 202, peak width 208, and periodicity 206 of the peaks, as shown in FIG. 2. In some embodiments, processing circuitry 106 compares the one or more characteristics to a database of characteristics obtained through empirical study of different obstacles. Processing circuitry 106 then identifies an obstacle if the one or more characteristics of the RCS substantially match characteristics in the database.

In other embodiments, processing circuitry 106 analyzes the values of the one or more characteristics to identify or detect an obstacle without comparison to a database. For example, threshold values can be set, such as minimum and/or maximum peak separation distance. The value of the peak separation distance in relation to the threshold value(s) is used to identify an obstacle.

Figure 3:
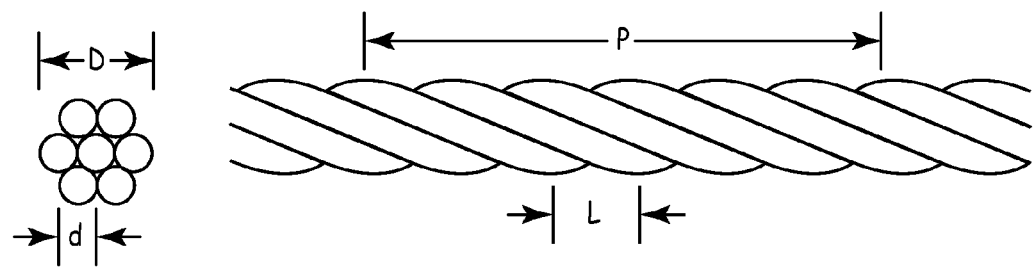
FIG. 3 is a diagram depicting exemplary attributes of a cable.

Furthermore, in one embodiment, processing circuitry 106 analyzes one or more characteristics of a reflection signal's RCS to determine attributes of the obstacle in addition to detecting the obstacle. As used herein, the term "attributes" of an obstacle refers to a physical property or feature of the obstacle. For example, FIG. 3 is a diagram depicting exemplary physical attributes of a cable which can be determined by processing circuitry 106. The exemplary attributes shown in FIG. 3 include strand diameter (d) of individual strands, cable diameter (D) of the entire cable, spacing between surfaces (L) of the cable, and spacing between turns (P) of a strand. However, it is to be understood that other attributes can be determined by processing circuitry 106 in other embodiments and for other obstacle types.

When an obstacle is detected, processing circuitry 106 outputs a signal to an output device 108 (FIG. 1) to provide an indication of the detected obstacle to a user. Output device 108 can be implemented, for example, as an audio device or visual display device. In addition, in some embodiments output device 108 is configured to provide other sensory warnings to a user, such as vibration of a steering wheel, in addition to or in lieu of audio and visual warnings. Furthermore, in some embodiments, the information provided to and output by output device 108 includes one or more attributes of the detected obstacle and/or the calculated range to the obstacle.

Figure 4:
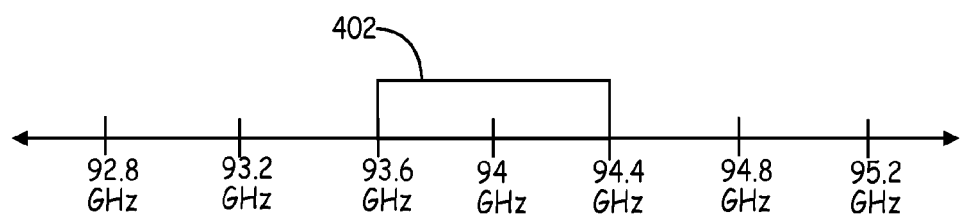
FIG. 4 is a graph depicting an exemplary frequency band used by one embodiment of an obstacle detection system.

In some embodiments, the RF signal is transmitted at a frequency of about 94 GHz. However, it is to be understood that, in other embodiments, other frequencies are used, such as about 35 GHz. In some such exemplary embodiments, as shown in FIG. 4, the FMCW RF signal has a frequency band 402 centered on about 94 GHz with a width of about 800 MHz. Hence, the transmitter and receiver linearly sweep the frequency band between 93.6 MHz and 94.4 MHz.

Figure 5:
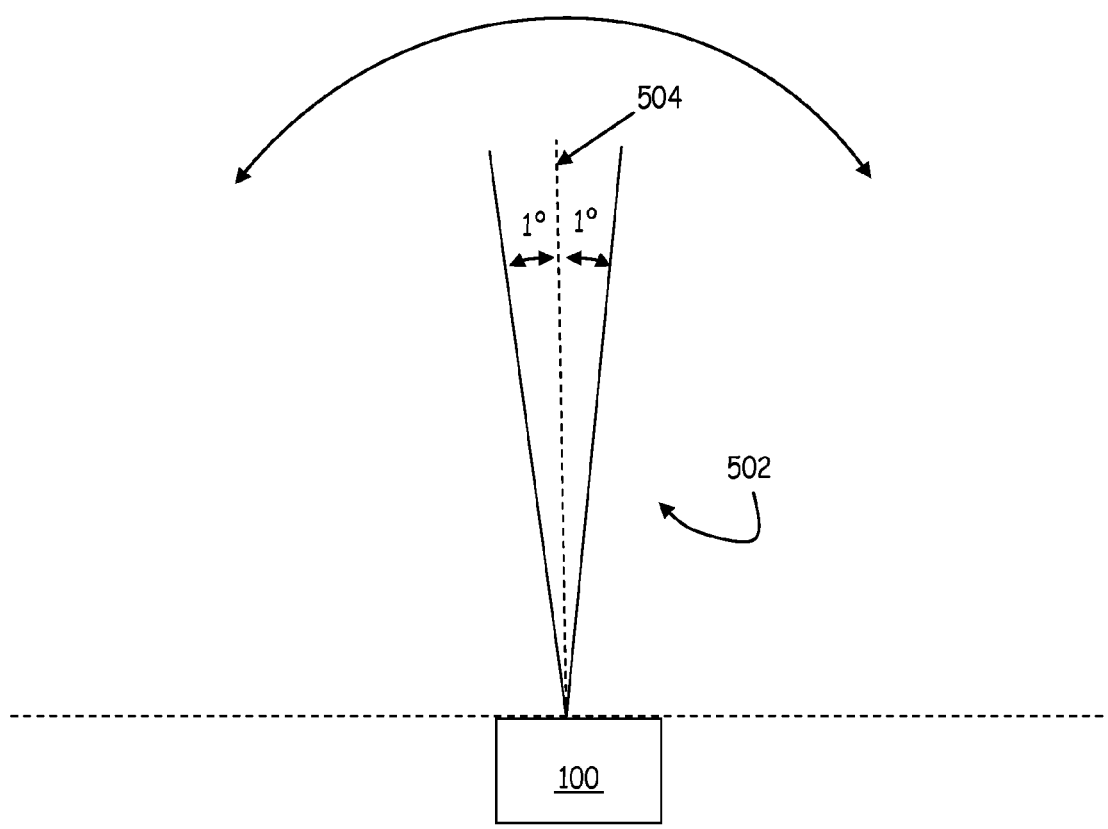
FIG. 5 is a diagram depicting field of view of an exemplary obstacle detection system.

Furthermore, as shown in FIG. 5, transmission antenna 112 has a beam width 502. In the example of FIG. 5, the beam width 502 is of the order of ±1 degree. System 100 rotates transmission antenna 112 and receiver antenna 110 along an azimuth plane (i.e., the plane parallel to the heading of the vehicle) in order to scan an area larger than the RF signal beam width 502. In particular, system 100 can scan ±90 degrees from center line 504. However, it is to be understood that, in other embodiments, system 100 can scan other area sizes. For example, system 100 can scan ±180 degrees in other embodiments. As system 100 scans an area, the incident angle of the transmitted RF signal contacting a stationary obstacle changes which, in turn, affects the power of the received reflection signal (i.e., RCS) at receiver antenna 110 as shown in FIG. 2.

All or some portions of the processing of reflection signals described above can be implemented in software instructions tangibly embodied on a computer readable medium and executed by a processing unit such as processing circuitry 106. Such computer readable media can be any available media that can be accessed by a general purpose or special purpose computer or processor, or any programmable logic device. Suitable computer readable media may include storage or memory media such as magnetic or optical media, e.g., disk or CD-ROM, volatile or non-volatile media such as RAM (e.g., SDRAM, DDR SDRAM, RDRAM, SRAM, etc.), ROM, EEPROM, flash memory, etc. as well as transmission media such as electrical, electromagnetic, or digital signals, conveyed via a communication medium such as a network and/or a wireless link.

Figure 6:
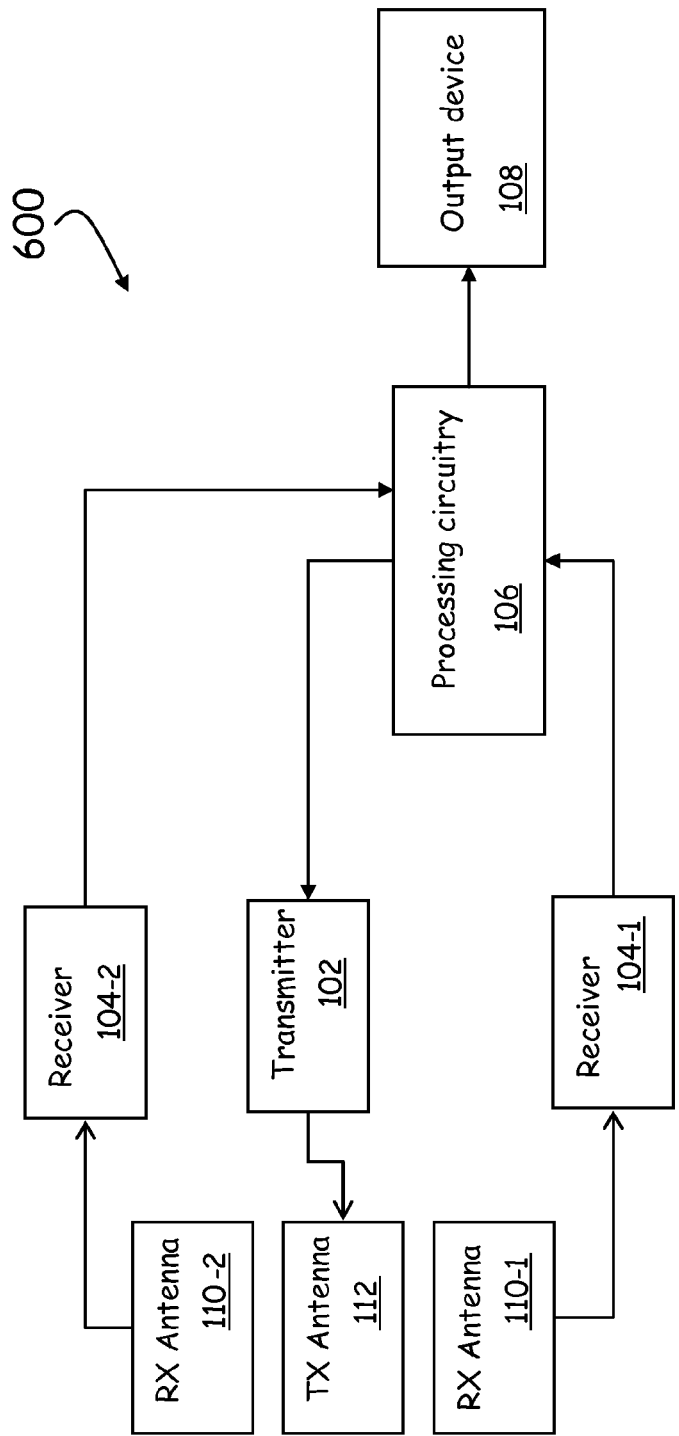
FIG. 6 is a block diagram depicting another embodiment of an obstacle detection system.

In another embodiment of an obstacle detection system 600 shown in FIG. 6, two receiver antennas 110-1 and 110-2 are used. Antennas 110-1 and 110-2 are separated by a vertical distance and enable processing circuitry 106 to verify the height of a detected obstacle with respect to the vehicle in which system 600 is located. In particular, processing circuitry 106 analyzes the phase difference between the reflected signal received by receiver antenna 110-1 and the reflected signal received by receiver antenna 110-2 in order to determine the height of the obstacle with respect to the vehicle as described in more detail in the '377 application. When two receiver antennas 110-1 and 110-2 are used, processing circuitry 106 also analyzes the correlation of radar returns between receiver antennas 110-1 and 110-2 as a characteristic of the RCS, in some embodiments.

Figure 7:
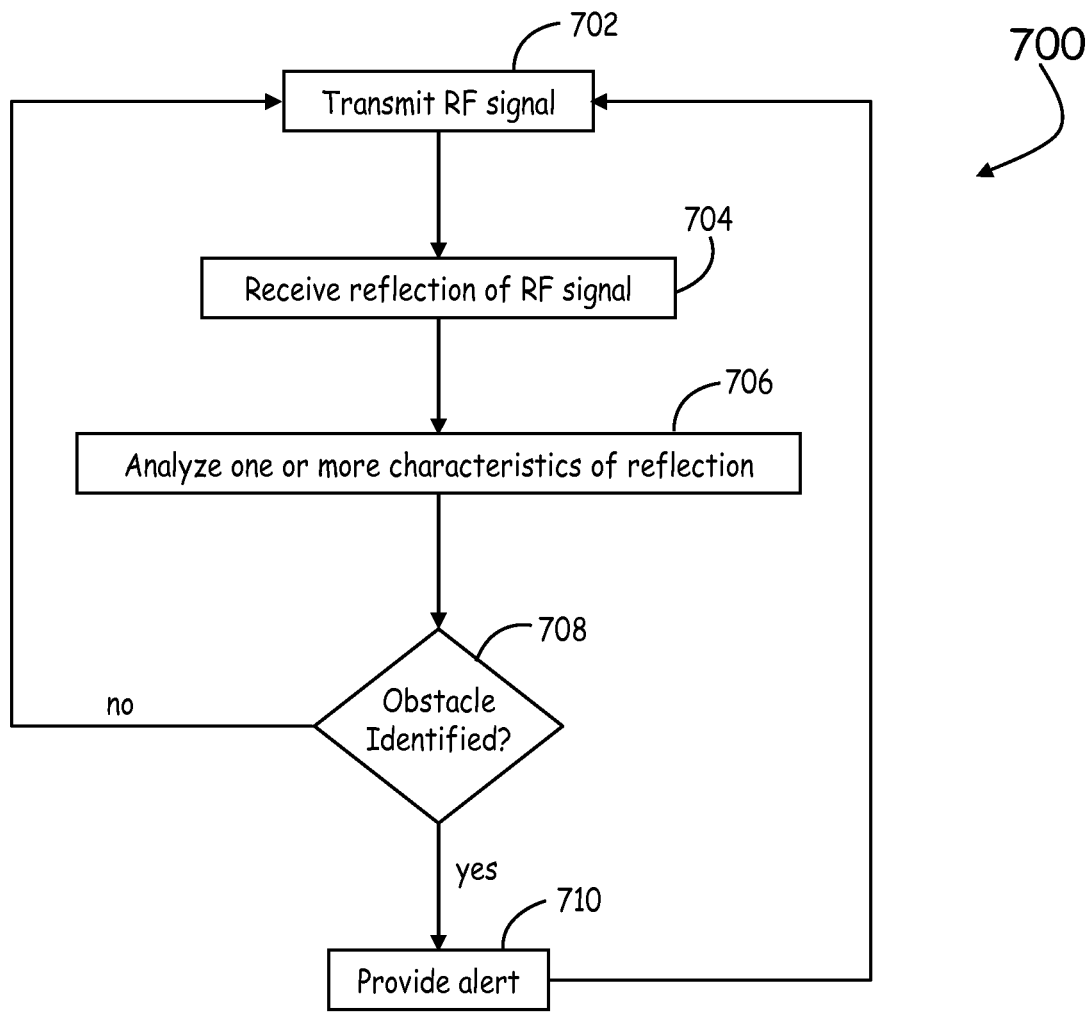
FIG. 7 is a flow chart depicting one embodiment of a method of detecting an obstacle.

FIG. 7 is a flow chart depicting one embodiment of a method 700 of detecting an obstacle. Method 700 can be implemented in a system such as system 100 described above. At 702, a transmission antenna transmits an RF signal. The transmitted RF signal is an FMCW RF signal in some embodiments. In addition, in some embodiments, transmitting an FMCW RF signal comprises transmitting a frequency band signal having a width of about 800 MHz and centered on about 94 GHz. In some such embodiments, transmitting the RF signal comprises linearly sweeping through the band of frequencies. At 704, a reflection of the transmitted RF signal is received at a receiver antenna.

At 706, processing circuitry analyzes one or more characteristics of the received reflection signal. In particular, processing circuitry analyzes one or more of the peak amplitude, peak separation distance, peak width, and periodicity of the peaks. In addition, in some embodiments, the one or more characteristics of the reflection signal are analyzed to detect an obstacle and at least one attribute of the obstacle. In some embodiments, the obstacles detected are cables. In some such embodiments, the attributes detected by the analysis of the one or more characteristics of the reflection signal include, but are not limited to, strand diameter of individual strands, cable diameter of the entire cable, spacing between surfaces of the cable, and spacing between turns of a strand.

If an obstacle is identified or detected at 708, an alert is provided to a user at 710. Providing an alert to a user can include, but is not limited to, providing an audio alert, visual alert, or vibration of a mechanical component, as described above. In addition, providing an alert includes, in some embodiments, providing information regarding the at least one detected attribute of the obstacle as well as the range to the obstacle. Method 700 then repeats at 702 to continue transmitting RF signals to detect an obstacle. If an obstacle is not detected at 708, method 700 repeats at 702 to continue transmitting RF signals to detect an obstacle.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An obstacle detection system, comprising:
   a transmission antenna operable to radiate a radio frequency (RF) signal, wherein the transmission antenna is configured to rotate;
   a transmitter operable to control transmission of the RF signal from the transmission antenna, wherein the transmitter is configured to control transmission of the RF signal as the transmission antenna rotates such that an incident angle at which the transmitted RF signal contacts an obstacle changes over time;
   a receiver antenna operable to receive a reflection of the RF signal; and
   processing circuitry operable to analyze one or more characteristics of a radar cross section (RCS) of the received reflection that result from changes in the incident angle to identify the obstacle and one or more physical attributes of the obstacle.

2. The obstacle detection system of claim 1, wherein the obstacle is a cable and the one or more physical attributes include at least one of a cable strand diameter, outside diameter of the cable, spacing between surfaces of the cable, and spacing between turns of a strand.

3. The obstacle detection system of claim 1, wherein the one or more characteristics of the received reflection of the RF signal include at least one of peak amplitude, peak width, and peak separation distance.

4. The obstacle detection system of claim 1, wherein the transmitter is operable to control transmission of a frequency modulated continuous wave (FMCW) radio frequency signal via the transmission antenna.

5. The obstacle detection system of claim 4, wherein the processing circuitry is operable to determine a range to the obstacle based on the received reflection of the FMCW radio frequency signal.

6. The obstacle detection system of claim 1, wherein the transmission antenna is operable to transmit a non-polarimetric RF signal.

7. The obstacle detection system of claim 1, wherein the transmission antenna and the receiver antenna are operable to rotate in an azimuth plane.

8. The obstacle detection system of claim 7, wherein the transmitter is operable to linearly sweep through a band of frequencies.

9. The obstacle detection system of claim 8, wherein the band of frequencies is about 800 MHz wide and centered on about 94 GHz.

10. The obstacle detection system of claim 1, further comprising a second receiver antenna, wherein the two receiver antennas are separated by a vertical distance and the processing circuitry is operable to determine the height of the obstacle relative to the obstacle detection system based on the phase difference between the received reflection of the RF signal received by each of the receiver antennas.

11. A method of detecting an obstacle, the method comprising:
    transmitting a radio frequency (RF) signal from a transmission antenna such that an incident angle at which the transmitted RF signal contacts an obstacle changes over time;
    receiving reflections of the RF signal;
    analyzing a plurality of characteristics of a radar cross section (RCS) of the received reflections of the RF signal that result from changes in the incident angle to identify the obstacle and at least one physical attribute of the obstacle; and
    providing an alert to indicate the detection of the obstacle.

12. The method of claim 11, wherein analyzing a plurality of characteristics of the received reflection of the RF signal comprises analyzing at least one of peak amplitude, peak width, and peak separation distance.

13. The method of claim 11, wherein the obstacle is a cable and the at least one physical attribute includes a cable strand diameter, outside diameter of the cable, spacing between surfaces of the cable, and spacing between turns of a strand.

14. The method of claim 11, wherein transmitting an RF signal comprises transmitting a frequency modulated continuous wave (FMCW) radio frequency signal.

15. The method of claim 14, wherein the FMCW radio frequency signal has a band of frequencies centered on about 94 GHz.

16. The method of claim 14, wherein transmitting an FMCW radio frequency signal comprises linearly sweeping through a selected band of frequencies.

* * * * *